(12) United States Patent
Menzel

(10) Patent No.: US 7,674,321 B2
(45) Date of Patent: Mar. 9, 2010

(54) METHOD FOR REMOVING ACID GASES FROM PRESSURIZED NATURAL GAS THAT IS CONTAMINATED WITH ACID GAS COMPOUNDS AND RECOVERING THE REMOVED ACID GASES AT AN INCREASED PRESSURE LEVEL

(75) Inventor: Johannes Menzel, Waltrop (DE)

(73) Assignee: Uhde GmbH, Dortmund (DE)

( * ) Notice: Subject to any disclaimer, the term of this patent is extended or adjusted under 35 U.S.C. 154(b) by 808 days.

(21) Appl. No.: 10/554,260

(22) PCT Filed: May 28, 2004

(86) PCT No.: PCT/EP2004/005773

§ 371 (c)(1),
(2), (4) Date: Sep. 19, 2006

(87) PCT Pub. No.: WO2004/105919

PCT Pub. Date: Dec. 9, 2004

(65) Prior Publication Data

US 2007/0006731 A1     Jan. 11, 2007

(30) Foreign Application Priority Data

May 28, 2003   (DE) .............................. 10 324 694

(51) Int. Cl.
*B01D 53/14* (2006.01)
*C10L 3/10* (2006.01)
*C07C 7/11* (2006.01)

(52) U.S. Cl. ...................... 95/177; 95/235; 423/242.1; 208/208 R

(58) Field of Classification Search ............... 95/156, 95/159, 160, 163, 164, 169, 172, 177, 235, 95/263; 423/220, 228, 229, 242.1; 208/208 R; 585/833
See application file for complete search history.

(56) References Cited

U.S. PATENT DOCUMENTS 3,594,985 A * 7/1971 Ameen et al. ................. 95/163
3,837,143 A * 9/1974 Sutherland et al. ............ 95/162
4,548,620 A * 10/1985 Albiol ......................... 95/174

(Continued)

FOREIGN PATENT DOCUMENTS

DE   197 53 903 A   6/1999

(Continued)

*Primary Examiner*—Frank M Lawrence
(74) *Attorney, Agent, or Firm*—Marshall & Melhorn, LLC

(57) ABSTRACT

A process for the removal of sour gas from pressurized natural gas which is polluted by sulphur compounds and other sour gas compounds includes initially feeding natural gas into a sour gas absorption unit, in which the sulphur components and any other components are absorbed by a physically acting solution yielding a sour gas rich absorbent. The absorbant is heated and fed into a high-pressure flash unit, in which the desorbed sour-gas is separated yielding a sour gas poor absorbent. The desorbed sour gas is cooled and the vaporized absorbent is condensed out of the sour gas stream. The sour-gas poor absorbent from the high-pressure flash unit is freed from residual sour gas in a gas stripping unit by stripping gas. The absorbent obtained in the sour gas unit is cooled and recycled permitting the desorbed sour gas to be condensed by cooling water or cooling air.

12 Claims, 1 Drawing Sheet

U.S. PATENT DOCUMENTS

| | | | |
|---|---|---|---|
| 4,617,038 A | * 10/1986 | Mehra | 62/635 |
| 4,976,935 A | * 12/1990 | Lynn | 423/222 |
| 5,782,958 A | * 7/1998 | Rojey et al. | 95/192 |
| 6,001,153 A | 12/1999 | Lebas et al. | |
| 6,102,987 A | 8/2000 | Gross et al. | |
| 6,139,605 A | 10/2000 | Carnell et al. | |
| 2005/0172807 A1 | * 8/2005 | Mak | 95/235 |

FOREIGN PATENT DOCUMENTS

EP  0 968 748 A  1/2000

* cited by examiner

METHOD FOR REMOVING ACID GASES FROM PRESSURIZED NATURAL GAS THAT IS CONTAMINATED WITH ACID GAS COMPOUNDS AND RECOVERING THE REMOVED ACID GASES AT AN INCREASED PRESSURE LEVEL

BACKGROUND OF THE INVENTION

The invention relates to a process for the removal of sour gases from pressurised natural gas which is polluted by sulphur compounds and other sour gas compounds. The process can be used for natural gas types that contain not only useful substances, such as methane and higher hydrocarbons but also impurities, such as hydrogen sulphide, organic sulphur components, e.g. mercaptanes, and carbon oxysulphide, as well as carbon dioxide and water vapour in different portions, the process according to the present invention being particularly suitable for natural gas types with a high hydrogen sulphide content.

As a rule, the sulphur components contained in the raw natural gas have to be removed to obtain a residual content of only a few ppm to permit further industrial utilisation of the natural gas. The removal of hydrogen sulphide, mercaptanes, carbon dioxide and other sour gas constituents from industrial gases is generally performed with the aid of chemically acting absorbents, such as amino solutions, alkali salt solutions, etc. or physically acting absorbents, such as Selexol, propylene carbonate, N-methyl pyrrolidone, Morphysorb, methanol, etc. in loop systems, the physically acting absorbents (as opposed to chemical scrubbing agents) being capable of removing organic sulphur components. In this process, the carbon dioxide contained in the gas is removed partially, totally or only as little as possible, depending on the requirements and specifications. An appropriate state-of-the-art technology is, for instance, described in DE 197 53 903 C2.

Normally, the sour gas from the absorbent regeneration unit is further processed to sulphur in a Claus plant. This means that, in addition to the investment costs for the desulphurisation unit itself, the investment costs for a Claus plant must also be taken into consideration for the overall investment costs. Anti-pollution legislation governing the residual content of sulphur components in a Claus plant necessitates the provision of a so-called "tail gas treatment unit" for the final desulphurisation of the Claus waste gas, which in fact significantly increases the investment costs further. Because of the world-wide surplus of elemental sulphur, which in turn originates from the desulphurisation of gases containing hydrogen sulphide, the recovered sulphur will only yield a negligible sales profit that would otherwise contribute towards the amortisation of the investment costs.

As an alternative to the recovery of elemental sulphur, therefore, the re-injection and storage of the sour gases obtained during the regeneration of absorbents in gas caverns is ever more often considered. In this process, the sour gases are compressed by means of costly compressors to a pressure that permits the sour gases to be pumped into an underground gas storage cavern, such as an exhausted gas field. The final pressures required for such re-injection are normally higher than the pressure at which the sulphur components are removed.

It would be particularly advantageous for such purposes if the sour gases obtained during the regeneration were at as high a pressure level as possible, because the investment costs could then be considerably reduced as a result of the required compressors being smaller or even obviated, and also because savings in the compressor operating costs can be achieved.

However, according to the current state of engineering technology, chemical or physical absorption processes are used for the absorption of hydrogen sulphide, mercaptanes, carbon dioxide and other sour gas constituents and for the preparation of the concentrated sour gases for re-injection into an underground storage cavern. In both processes, the regeneration of the absorbent takes place at a slightly elevated pressure of 0.1 to 1 bar(g). The respective sour gas is also obtained at this low working pressure.

The aim of the invention is thus to provide a process that is equally suitable for the treatment of polluted natural gas and for providing sour gas at an elevated pressure, and which provides the sour gas in a state that is suitable for its re-injection into gas fields that are or are about to be exploited.

BRIEF SUMMARY OF THE INVENTION

The invention solves the problem described by initially feeding the gas to be desulphurised into a sour gas absorption unit, in which the sulphur components and any further components are absorbed by means of a physically acting solution, heating the absorbate, feeding the absorbate into a high-pressure flash unit, in which the sour-gas-poor absorbent and desorbed sour gas contained in the resulting mixture are separated, cooling the desorbed sour gas and condensing the vaporised absorbent out of the sour gas stream, using stripping gas in a gas stripping unit to remove residual sour gas from the sour-gas-poor absorbent leaving the high-pressure flash unit, adjusting the pressure in the high-pressure flash unit to a value at which the desorbed sour gas can be condensed with the aid of cooling water or cooling air, cooling the recovered absorbent and recycling it to the sour gas absorption unit.

The pressure in the high-pressure flash unit should be adjusted to a value between 10 and 100 bar, preferably between 30 and 70 bar. The pressure adjustment in the high-pressure flash unit should be such that the desorbed sour gas temperature is between 20° C. and 80° C., preferably between 40° C. and 60° C. and that the desorbed sour gas be predominantly in liquid state, so that it is readily condensable. If the meteorological conditions at the plant location are such that other coolant temperatures result, then these temperatures are decisive. This permits the sour gas to be condensed by means of cooling air or water and the re-injection to be performed favourably by means of pumps instead of the hitherto commonly used costly compressors, which in fact constitutes an advantage of the invention.

In an embodiment of the process in accordance with the present invention, the laden stripping gas obtained is cooled and fed to the sour gas absorption unit. Such a procedure is particularly recommendable whenever purified feed gas or natural gas is used as the stripping gas. The recycling prevents natural gas losses and, in addition, if natural gas is used it is unnecessary to provide gas from other sources.

In an embodiment of the process in accordance with the present invention, the absorbate from the sour gas absorption unit is fed—prior to being heated—to a recycle flash unit, in which the pressure is partially reduced and the absorbate and desorbed gas contained in the resulting mixture are separated, and the desorbed gas obtained in the recycle flash unit is re-compressed and returned to the sour gas absorption unit.

A specialist versed in the art will provide such a recycle flash unit whenever the absorbent used is insufficiently selective with regard to sour gases and also dissolves valuable natural gas constituents. The major portion of these valuable natural gas constituents is desorbed in the recycle flash unit and can be returned to the sour gas absorption unit without any problems.

The partial pressure reduction in the recycle flash unit can, for example, be performed by means of a device for the recovery of mechanical work, especially by using an expansion turbine or a pump running counter-clockwise according to the current state of engineering technology.

In a further embodiment of the process in accordance with the present invention, the absorbent contained in, and condensed out of, the desorbed sour gas is admixed to the absorbate prior to heating the latter.

In further embodiments of the process in accordance with the present invention, the pressure of the absorbate fed to the heating facilities is raised to a pressure that is at least higher than the pressure in the recycle flash unit, if such a unit is provided.—It is advantageous to select as high a pressure in the high-pressure flash unit as compatible with process engineering requirements, so that this will normally be higher than the pressure in the recycle flash unit, if such a recycle flash unit is provided, because this constitutes an advantage for the subsequent re-injection of the sour gas. An even greater advantage is obtained if the entire pressure level can be raised to a value that is always above the pressure of the sour gas absorption unit, because the recycled gas streams would not have to be compressed in this case.

In further embodiments of the process in accordance with the present invention, the laden stripping gas and the gas from the recycle flash unit, if such a unit is provided, are alternatively combined, then re-compressed in one single compressor and jointly fed into the sour gas absorption unit, or the stripping gas is compressed to a pressure above that of the sour gas absorption unit, the laden stripping gas then being combined with the gas obtained from the recycle flash unit and then fed jointly into the sour gas absorption unit. Its advantageous to feed the gases into the sour gas absorption unit simultaneously with the feed gas.

In a further embodiment of the process in accordance with the present invention, the high-pressure flash unit is designed in the form of a cascade of series-connected flash vessels with preceding partial pressure reduction and re-compression of the sour gases obtained from the respective downstream flash vessels to the pressure of the first flash vessel. In this process, the major part of the sour gas is released in the first flash vessel.

BRIEF DESCRIPTION OF THE DRAWING

The invention is described in more detail below with the aid of a process diagram illustrated in FIG. 1.

DETAILED DESCRIPTION OF THE INVENTION

Figure 1:
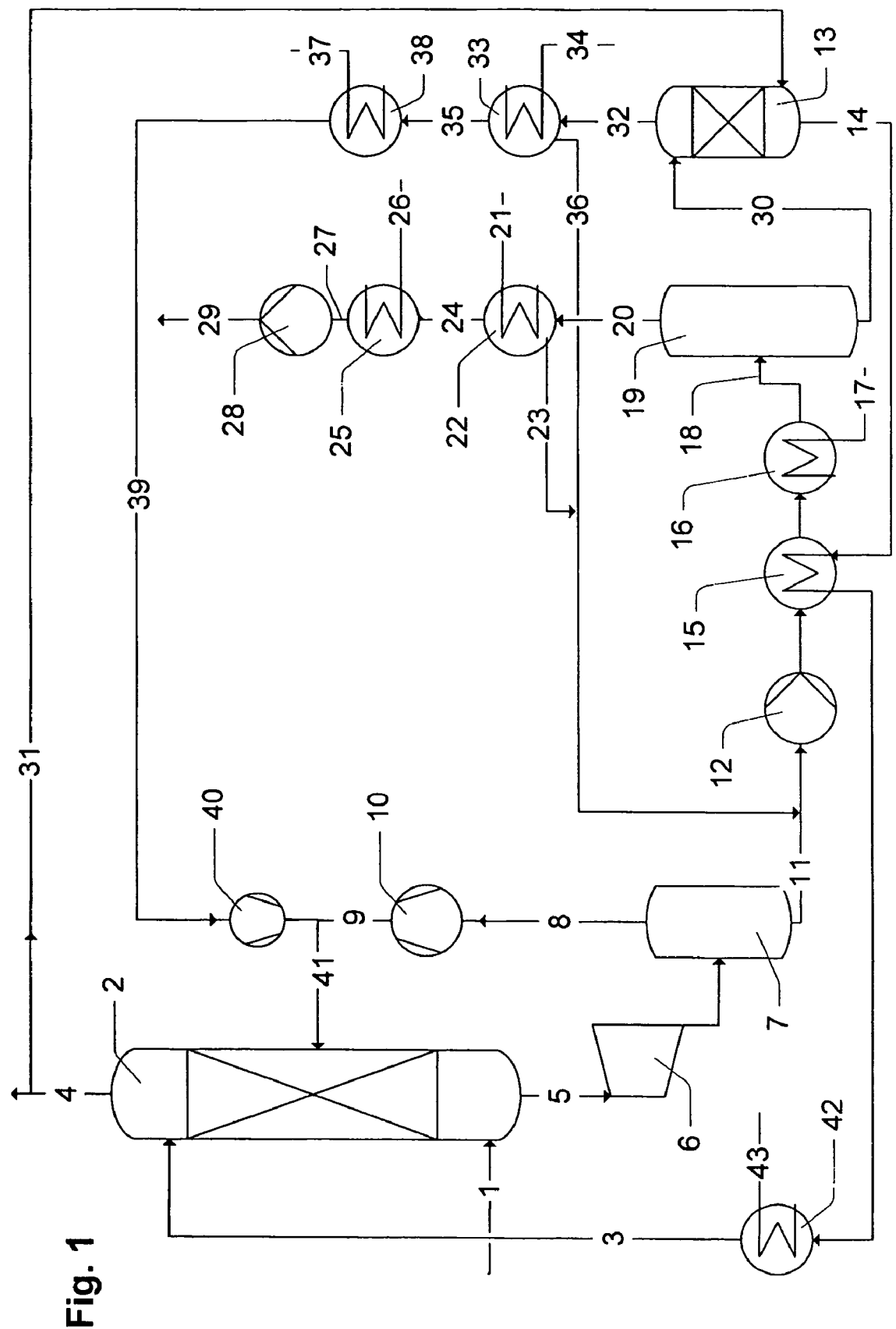
FIG. 1 shows the process according to the present invention, consisting of a sour gas absorption unit, 2 flash units, a gas stripping unit and the routing of the main process streams, the process according to the present invention not being limited to this particular configuration used as an example.

The raw natural gas 1 is initially fed to the bottom zone of the sour gas absorption unit consisting of absorption column 2, the sour gas components contained in the gas being removed in counter-current by the regenerated absorbent 3 fed to the head of absorption column 2. The treated product gas 4 is withdrawn at the head of the absorption column. The absorbent 5, which is laden with sour gas components, withdrawn from the bottom of absorption column 2 is flashed by expansion turbine 6 into a flash vessel 7. The flash gases 8 released by pressure reduction contain a major portion of the hydrocarbons co-absorbed from the raw natural gas 1 in recycle gas stream 9. These are returned to absorption column 2 by means of recycle compressor 10.

The absorption solution 11 leaving flash vessel 7 and mainly laden by sour gas components is compressed by means of pump 12 to a pressure which permits the sour gas released in the high-pressure flash unit to be condensed with the aid of cooling water or in an air cooler. After heat exchange with the hot regenerated absorption solution 14 from high-pressure desorption column 13 in heat exchanger 15 and after further pre-heating in pre-heater 16 by means of a heating agent stream 17, the laden solution 18 is flashed into a high-pressure flash vessel. In this process, a major portion of the sour gases 20 contained in the absorption solution is released overhead. The absorbent contained in the sour gases is condensed in cooler 22 by means of coolant 21 and the condensate 23 is returned into the cycle. The sour gas fraction 24 is then further cooled by means of cooling water 26 in sour gas condenser 25 and is thus liquefied. The pressure of the liquefied sour gas 27 is raised by means of pump 28 to the pressure required for re-injection and conveyed in the form of re-injection stream 29 to the final storage cavern.

In order to remove the residual sour gas components still contained in absorbent stream 30 which leaves high-pressure flash vessel 19, this stream is fed to the head of a high-pressure desorption column 13. In high-pressure desorption column 13, the enriched solution from above is in counter-current freed from residual sour gas components, especially sulphur components, using sulphur-free or sulphur-poor natural gas 31 which is withdrawn as a part-stream from the purified product gas 4, the fluid exchange elements contained in high-pressure desorption column 13, such as valve trays, packing material or structured packing making for the necessary exchange of fluids involved. A concentrated sour gas fraction 32 is recovered at the head of high-pressure desorption column 13.

The concentrated sour gas fraction 32 leaving the head of high-pressure desorption column 13 is cooled for the purpose of absorbent recovery in a cooler 33 by means a coolant 34, e.g. cooling water or cooling air, and leaves the cooler as sour gas stream 35. The recovered absorbent 36 is combined with the laden absorbent 11 on the suction side of pump 12. The sour gas stream 35 is further cooled in cooler 38 by means coolant 37 and compressed as cooled sour gas 39 in compressor 40, before it is returned to absorption column 2 together with recycle stream 9 as return stream 41. After heat exchange in heat exchanger 15 and cooling in cooler 42 by means of coolant or refrigerant 43 to the specified absorbent temperature, the fully regenerated absorption solution 14 is fed to the head of absorption column 2 for the specified degree of absorption of the sour gas components contained in natural gas 1.

Table 1 below shows a calculated example, with the stream numbers corresponding to those in FIG. 1 with the exception of stream 31. In the calculated example, stream 31 is a pure methane stream imported from external sources.

TABLE 1

|  | | Stream No. | | | | |
|---|---|---|---|---|---|---|
|  | | 1 | 4 | 8 | 39 | 24 | 27 |
| Temperature [° C.] | | 52 | 12 | 35 | 50 | 63 | 50 |
| Pressure [bar] | | 67.5 | 67.0 | 10.0 | 4.0 | 42.0 | 39.5 |
| State of aggregation | | gaseous | gaseous | gaseous | gaseous | gaseous | liquid |
| Component rate [kmol/h] | $H_2O$ | 0.4 | 0.0 | 0.0 | 0.2 | 0.4 | 0.4 |
| | $N_2$ | 99.1 | 99.1 | 0.9 | 0.0 | 0.0 | 0.0 |
| | $CO_2$ | 480.6 | 428.5 | 154.0 | 8.2 | 52.1 | 52.1 |
| | $H_2S$ | 1940.4 | 0.001 | 1372.8 | 870.3 | 1940.4 | 1940.4 |
| | $CH_4$ | 5460.8 | 5660.0 | 326.7 | 199.3 | 10.1 | 10.1 |
| | $C_2H_6$ | 955.2 | 935.6 | 151.8 | 4.8 | 19.6 | 19.6 |
| | $C3^+$ | 1063.5 | 936.5 | 289.8 | 59.8 | 127.0 | 127.0 |
| | Absorbent | | | | | | |

|  | | Stream No. | | | | |
|---|---|---|---|---|---|---|
|  | | 31 | 5 | 11 | 30 | 14 |
| Temperature [° C.] | | 100 | 61 | 35 | 196 | 172 |
| Pressure [bar] | | 10.0 | 67.0 | 10.0 | 42.0 | 4.0 |
| State of aggregation | | gaseous | liquid | liquid | liquid | liquid |
| Component rate [kmol/h] | $H_2O$ | 0.0 | 4.4 | 4.4 | 5.1 | 3.7 |
| | $N_2$ | 0.0 | 0.9 | 0.0 | 0.0 | 0.0 |
| | $CO_2$ | 0.0 | 214.4 | 60.3 | 8.3 | 0.0 |
| | $H_2S$ | 0.0 | 4183.5 | 2810.7 | 882.0 | 0.003 |
| | $CH_4$ | 209.3 | 337.4 | 10.6 | 0.6 | 10.6 |
| | $C_2H_6$ | 0.0 | 176.2 | 24.4 | 4.8 | 0.0 |
| | $C3^+$ | 0.0 | 476.7 | 186.8 | 60.2 | 0.0 |
| | Absorbent | | 4121 | 4121 | 4175 | 4121 |

Key to References

| 1 | Raw natural gas |
| 2 | Absorption column |
| 3 | Regenerated Absorbent |
| 4 | Purified product gas |
| 5 | Laden absorbent |
| 6 | Expansion turbine |
| 7 | Flash vessel |
| 8 | Flash gas |
| 9 | Recycle gas stream |
| 10 | Recycle compressor |
| 11 | Laden absorption solution |
| 12 | Pump |
| 13 | High-pressure desorption column |
| 14 | Regenerated absorption solution |
| 15 | Heat exchanger |
| 16 | Pre-heater |
| 17 | Heating agent stream |
| 18 | Laden solution |
| 19 | High-pressure flash vessel |
| 20 | Sour gas |
| 21 | Coolant |
| 22 | Cooler |
| 23 | Condensate |
| 24 | Sour gas fraction |
| 25 | Sour gas condenser |
| 26 | Cooling water |
| 27 | Liquefied sour gas |
| 28 | Pump |
| 29 | Re-injection stream |
| 30 | Absorbent stream |
| 31 | Sulphur-free natural gas |
| 32 | Concentrated sour gas fraction |
| 33 | Cooler |
| 34 | Coolant |
| 35 | Sour gas stream |
| 36 | Recovered absorbent |
| 37 | Coolant |
| 38 | Cooler |

-continued

| 39 | Cooled sour gas |
| 40 | Compressor |
| 41 | Recycle stream |
| 42 | Cooler |
| 43 | Coolant or refrigerant |

The invention claimed is:

1. A process for the removal of sour gas from pressurized natural gas which is polluted by sulphur compounds and other sour gas compounds, comprising:

initially feeding natural gas, which is to be desulphurized, into a sour gas absorption unit, in which the sulphur components are absorbed by a physically acting solution thus yielding a sour-gas rich absorbent;

heating the sour-gas rich absorbent;

feeding the sour-gas rich absorbent into a high-pressure flash unit, in which desorbed sour gas is separated yielding a sour-gas poor absorbent;

cooling the desorbed sour gas and condensing the vaporized absorbent out of the sour gas stream;

freeing the sour-gas-poor absorbent from the high-pressure flash unit from residual sour gas in a gas stripping unit by means of stripping gas; and cooling and recycling the absorbent obtained to the sour gas absorption unit, wherein a pressure is set in the high-pressure flash unit that permits the desorbed sour gas to be condensed by means of cooling water or cooling air, wherein the absorbent contained in the desorbed sour gas is condensed and admixed to the sour gas rich absorbent prior to heating the sour gas rich absorbent.

2. The process according to claim 1, wherein the laden stripping gas obtained is cooled and fed to the sour gas absorption unit.

3. The process according to claim 1, wherein the stripping gas comprises either purified feed gas or desulphurised natural gas.

4. The process according to claim 2, wherein the stripping gas is fed to the sour gas absorption unit simultaneously with the feed gas.

5. The process according to claim 1, wherein the pressure of the sour-gas rich absorbent to be heated is set to a pressure that is higher than that in the sour gas absorption unit.

6. The process according to claim 2, wherein the pressure of the stripping gas used is set to a pressure above that of the sour gas absorption unit and then fed into the sour gas absorption unit.

7. The process according to claim 1, wherein
prior to being heated, the sour-gas rich absorbent from the sour gas absorption unit is fed to a recycle flash unit, in which a partial pressure reduction takes place, and the absorbent and desorbed gas are separated, and
the desorbed gas obtained in the recycle flash unit is re-compressed and recycled to the sour gas absorption unit.

8. The process according to claim 7, wherein the pressure of the sour-gas rich absorbent to be heated is set to a pressure that is higher than that in the recycle flash unit.

9. The process according to claim 7, wherein the pressure in the high-pressure flash unit is higher than that in the recycle flash unit.

10. The process according to claim 1, wherein:
prior to being heated, the sour-gas rich absorbent from the sour-gas absorption unit is fed to a recycle flash unit, in which a partial pressure reduction takes place, and the absorbent and desorbed gas are separated; and
the desorbed gas obtained in the recycle flash unit is re-compressed and recycled to the sour gas absorption unit; wherein
the laden stripping gas and the gas obtained in the recycle flash unit are combined, re-compressed and fed to the sour gas absorption unit.

11. The process according to claim 1, wherein the high-pressure flash unit consists of a cascade of several series-connected flash vessels preceded by partial pressure reduction and re-compression of the sour gases obtained from the downstream flash vessels to the pressure of the first flash vessel of the cascade.

12. A process for the removal of sour gas from pressurised natural gas which is polluted by sulphur compounds and other sour gas compounds, comprising
initially feeding the natural gas, which is to be desulphurised, into a sour gas absorption unit, in which the sulphur components are absorbed by a physically acting solution thus yielding a sour-gas rich absorbent;
heating the sour-gas rich absorbent;
feeding the sour-gas rich absorbent into a high-pressure flash unit, in which desorbed sour gas is separated yielding a sour-gas poor absorbent;
cooling the desorbed sour gas and condensing the vaporised absorbent out of the sour gas stream;
freeing the sour-gas-poor absorbent from the high-pressure flash unit from residual sour gas in a gas stripping unit by means of stripping gas; and
cooling and recycling the absorbent obtained to the sour gas absorption unit, wherein a pressure is set in the high-pressure flash unit that permits the desorbed sour gas to be condensed by means of cooling water or cooling air,
wherein
prior to being heated, the sour-gas rich absorbent from the sour gas absorption unit is fed to a recycle flash unit, in which a partial pressure reduction takes place, and the absorbent and desorbed gas are separated;
the desorbed gas obtained in the recycle flash unit is re-compressed and recycled to the sour gas absorption unit; and
the laden stripping gas and the gas obtained in the recycle flash unit are combined, re-compressed and fed to the sour gas absorption unit.

* * * * *